United States Patent

Hahn et al.

[15] 3,642,447
[45] Feb. 15, 1972

[54] BROMINE PURIFICATION PROCESS BY ADDITION OF STEAM TO THE VAPOR PHASE

[72] Inventors: Lynn Harold Hahn, 1208 Pine Street, Alma, Mich. 48801; Clarence Wendell Dunbar, 308 Wilson Drive, St. Louis, Mich. 48880

[22] Filed: July 23, 1969

[21] Appl. No.: 844,060

[52] U.S. Cl..................................23/218, 203/12, 203/39, 203/95
[51] Int. Cl.........................................B01d 3/38
[58] Field of Search...............23/218, 216; 203/39, 42, 12, 203/92, 93, 95–97, 87

[56] References Cited

UNITED STATES PATENTS

| 8,490 | 11/1851 | Robbins | 203/95 |
|---|---|---|---|
| 82,309 | 9/1868 | Hagemann | 203/95 |
| 1,902,801 | 3/1933 | Harlow et al. | 23/218 |
| 1,956,993 | 5/1934 | Martin | 23/218 |
| 2,658,864 | 11/1953 | Ebel | 203/95 |
| 3,181,934 | 5/1965 | Davis | 23/218 |
| 3,314,762 | 4/1967 | Hahn | 23/218 |
| 3,449,220 | 6/1969 | Geisler et al. | 203/92 |

Primary Examiner—Wilbur L. Bascomb, Jr.
Attorney—D. Cameron Pond

[57] ABSTRACT

A process for removing impurities from bromine, especially water-soluble impurities, comprising introducing steam into the impure bromine in the vapor phase and thereafter condensing the bromine and steam to the liquid phase, followed by separating the bromine from the water, and drying. If desired the impure bromine may be heated, as in a hot tube, prior to the steam treatment and distilled.

3 Claims, 1 Drawing Figure

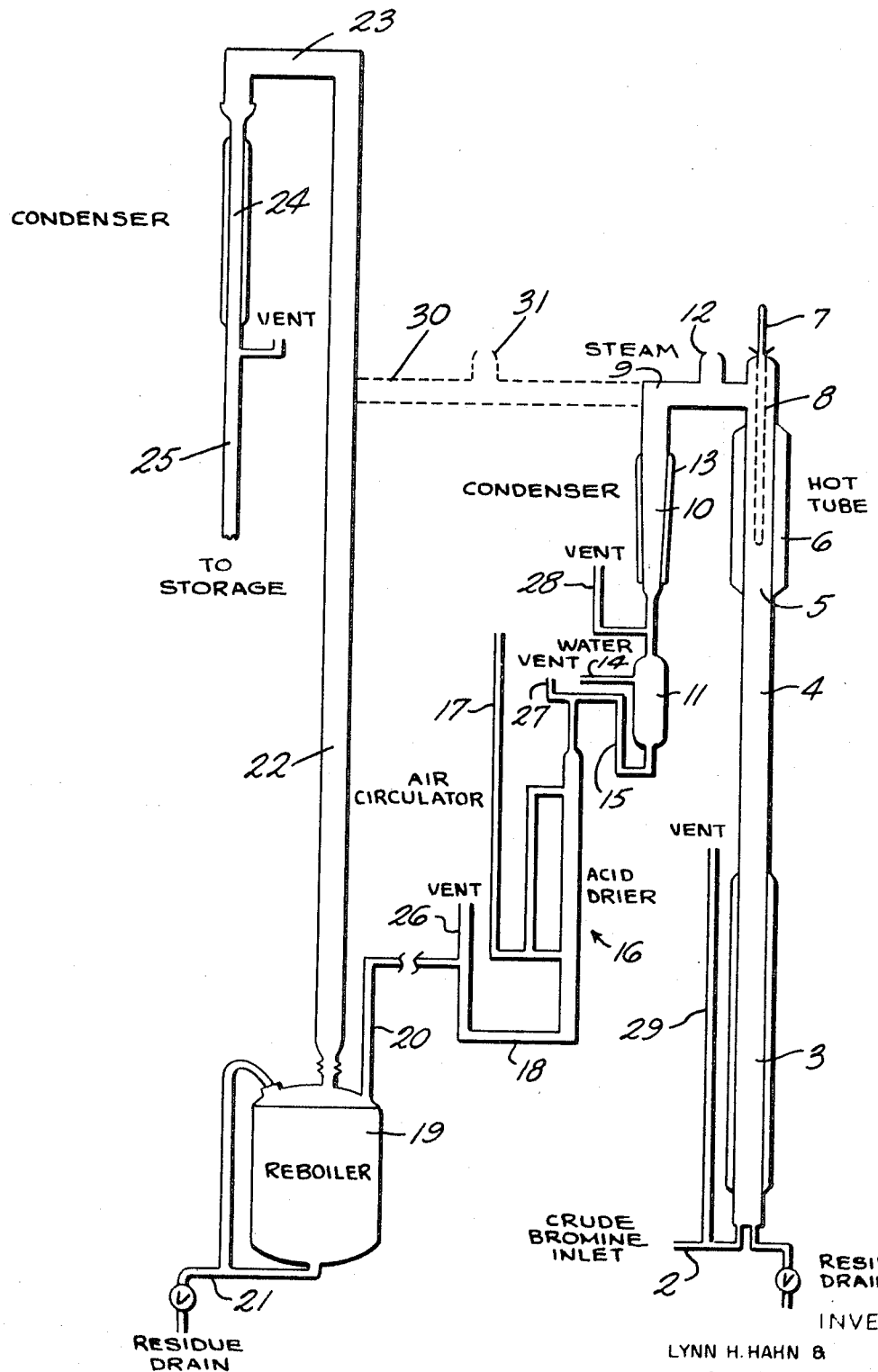

BROMINE PURIFICATION PROCESS BY ADDITION OF STEAM TO THE VAPOR PHASE

The present invention relates to a process for removing impurities from bromine, relating more particularly to a process for the preparation of purified bromine whereby water soluble impurities in particular are substantially completely removed from bromine containing them.

Bromine has a wide variety of uses both in its liquid form and as a gas. Among such uses are the preparation of disinfectants and photographic materials, and as an intermediate in the manufacture of dyestuffs, drugs, resins and refrigerants. Many of these uses and other uses as well, require very highly purified bromine, the use of bromine in the production of pharmaceutical products being a case in point. Much of the bromine produced in commercial quantities is obtained from brine originating in wells. Bromine extracted from such brine, not only contains impurities introduced from the brine, but also those introduced as a result of the treatment of the brine to free the bromine. Usually the brine is first heated and is then treated with a mixture of chlorine and steam countercurrently in a suitable tower. The chlorine reacts with the bromides present in the brine to provide free bromine, the chlorine replacing the bromine. The bromine is removed from the top of the tower as a gas together with the steam. In addition to the other impurities mentioned, this process tends to introduce chlorine into the bromine, and chlorine is surprisingly difficult to remove since it tends to form bromine-chlorine complexes which are soluble in bromine.

Although it is possible to distill the impure bromine, to pass it through a chlorine separator to remove chlorine, and then to dry it, many compounds which are impurities in the bromine are persistant and continue to contaminate the bromine in spite of these efforts to purify it. Among such contaminants are chloroform, ethyl bromide, ethylene chlorobromide, dibromochloromethane, carbon tetrachloride and bromodichloromethane. In addition, such impure bromine usually contains some water and hydrogen chloride and possibly carbon dioxide depending upon the amount and kind of hydrocarbon material present in the bromine. Some of these contaminants are especially difficult to remove because they have a boiling point which is close to that of bromine, and therefore can not be separated by fractional distillation. Chloroform is an example. Other compounds are particularly difficult to remove because very small amounts are found to be most objectionable, and the large volume of bromine as compared with the small quantity of contaminant presents a difficult problem.

Various processes have been suggested in the prior art for the treatment of the relatively crude bromine referred to above to produce more pure bromine than the ordinary distillation and drying operations can accomplish. For instance, U.S. Patent No. 2,929,686 discloses a process wherein crude bromine is heated to a temperature of about 1,000° C. Oxygen is then introduced into the crude bromine stream and the impurities, particularly the hydrocarbon impurities, are oxidized at this high temperature to carbon dioxide. Bromine is recovered by means of an ice trap. While this process produces rather pure bromine, it is obviously a very difficult one to operate commercially and is not economic. Furthermore, it does not remove some impurities, particularly chlorine and certain chlorine-containing compounds.

Another process utilizes a hot tube treatment — see U.S. Pat. No. 3,233,972. According to this process, crude bromine is first volatilized and then is heated in the hot tube to a temperature of about 425° to 625° C. to brominate certain of the impurities and thus, to decrease their vapor pressure and raise their boiling point so that they can be more readily separated from the bromine by a later distillation step. This process is a more practical one, but in order to remove HCl and other water-soluble materials from the bromine, it is necessary not only to distill the bromine from the high-boiling brominated impurities, but to wash the bromine with water. This washing operation although theoretically easy to accomplish, has proven to be considerably more difficult than anticipated. In the first place, the volume of the water-soluble impurities as compared with the volume of the bromine is small indeed, and it is most difficult to successfully wash out substantially all of these impurities without using a very large volume of water. This results in loss of bromine which is slightly soluble in water. If the bromine thus lost is to be recovered, it adds appreciably to the expense of the operation, and in fact is usually not feasible economically. Furthermore, the washing operation does not, as a practical matter, sufficiently completely remove the water-soluble impurities despite the large volume of water used. It appears to be a matter of failure to intermix the bromine and water sufficiently and within a reasonable washing time especially if the process is a continuous one.

Other means for the preparation of high-purity bromine have also been considered in the prior art, such as the use of various absorbent materials for the impurities. Such absorbents have been difficult to use since they tend to agglomerate, thus reducing the flow of the bromine and rendering the absorbent ineffective. Also, complicated and unusual distillation operations as well as refined chlorine separation techniques have been added to or made a part of the conventional process discussed above. These have been found to be unacceptable for various reasons. Usually they do not remove the impurities satisfactorily, or they have proved to be entirely impracticable from the economic point of view. As explained in greater detail hereinafter, for present purposes it is preferable that the total impurities not exceed 200 parts per million and some other specifications are difficult to meet. For example, the total organic materials; that is, the hydrocarbons should not exceed 30 parts per million. Thus, some processes which may successfully remove one or more of these impurities, either do not reduce the total impurities sufficiently or do not remove some particular impurity to the extent needed to meet the specifications required by the consumer for purified bromine.

The method of the present invention is simple, more effective, and more economical to operate than those previously known and produces bromine which is highly purified. In carrying out this process, the crude bromine is first dried, if necessary, and is then vaporized to a gas. The boiling point of pure bromine is 58.8° C. at standard pressure. The crude bromine in the vapor phase is then treated with steam, and the steam and bromine are condensed together so that both are in the liquid phase. The bromine and water are then separated, and the bromine is dried to remove the last traces of water, insofar as possible, and is stored. In order to obtain a very pure product, and to meet the specifications for purified bromine if they are particularly rigorous, it is desirable first to dry and vaporize the bromine, as pointed out above, and then subject it to a heat treatment in a hot tube. The temperature of the tube should be at least 700° F. but could be higher, say about 1,000° F. Even higher temperatures are not necessarily undesirable, but have a tendency to oxidize the hydrocarbon impurities to $CO_2$ and, of course, present problems from the point of view of materials of construction. Temperatures lower than about 700° F. are not recommended since the desired bromination of the impurities or at least some of them does not appear to take place effectively. Bromine having been subjected to the hot tube treatment can then be treated with steam in the manner mentioned above. If the hot tube treatment is used, it is, of course, necessary to subject the bromine to a later distillation step in order to separate the brominated impurities from the bromine. While a complicated fractionating column could be used, it is not necessary. For example, a simple reboiling and condensing operation should be adequate.

The process of the present invention is best conducted continuously; and the attached drawing schematically shows apparatus useful in the practice of the invention.

Referring to this drawing, crude bromine to be purified is introduced through the pipe 2 into the bottom of a vertically positioned glass lined steel vaporizer 3 which is heated by circulating hot water through a conventional water jacket surrounding it (not shown). The crude bromine in the vapor phase flows upwardly through the pipe 4 into a vertically positioned heated quartz tube 5 preferably formed from the material known as "Vycor". The tube 5 may be heated by any suitable means. For example, heating rods may be disposed around the tube 5, each rod being connected to a suitable source of electric current through appropriate leads (not shown) and, of course, to an external electrical heating circuit. The heating rods or other suitable heating apparatus placed about the tube 5 should be surrounded by insulating material such as the magnesia insulating material shown at 6. A thermometer 7 is placed in the thermometer well 8.

The heated bromine emerging from the hot tube 5 is then passed through pipe 9 downwardly through the condenser 10, and finally to the gravity separator 11. A steam inlet 12 is located in the tube 9 beyond the hot tube 5. By means of this steam inlet, steam is added to the vaporized bromine and the steam and bromine are both condensed; that is, cooled and liquefied by passing through the condenser 10 and are collected in the separator 11. The condenser 10 needs to be cooled, of course, and can be cooled by any suitable means although a conventional water jacket 13 whereby cooling water is circulated about the condenser, provides one appropriate means. The liquid water and the bromine are allowed to separate by gravity in the separator 11, the water then being piped from the separator by means of the connecting pipe 14 to one of the bromine towers for recovery of any dissolved bromine which may remain in it. The liquid bromine passes through the pipe 15 to a sulfuric acid dryer shown generally at 16. The sulfuric acid dryer 16 contains in addition to sulfuric acid, ceramic saddles or the like and is provided with an air circulatory system so that fresh sulfuric acid may be added as necessary by means of the pipe 17. If necessary or desirable, the sulfuric acid may be circulated from the bottom to the top of the drying mechanism shown at 16 in order to remove the last traces of water from the bromine.

The dried bromine passes through the pipe 18 to the reboiler 19 by means of the connecting pipe 20. The temperature of the reboiler 19 is maintained at or slightly above the boiling point of bromine so that both liquid and gaseous bromine are present therein. In the reboiler a still bottom portion containing contaminants; that is, the higher boiling contaminants including those resulting from the hot tube operation, is removed through the pipe 21. The gaseous bromine which may contain some brominated contaminants in the gaseous phase passes from the reboiler 19 into a column 22 which is maintained at the boiling point of bromine. This column may contain, if desired, ceramic beads, saddles or the like. The higher boiling contaminants gradually pass downwardly in the column 22 and are eventually removed through the drain 21. The gaseous bromine which has now been separated from the contaminants as well as being dried, passes upwardly and out through the overhead pipe 23 into the condenser 24 where the bromine is condensed to the liquid phase. The purified bromine then leaves the condenser through the pipe 25 where it is piped to a suitable storage tank.

Vents 26, 27, 28 and 29 are provided throughout the system to maintain atmospheric pressure where necessary or desirable. It will be noted that these vents are provided at points in the system where the bromine is in the liquid phase and they lead to a common chamber (not shown) finally venting to the atmosphere. The pipe 17 of the sulfuric acid drying system in a sense is a vent although it may also be used to introduce sulfuric acid. Also, the vent 26 may be provided with a suitable drying tube or the like (not shown) to prevent moisture from getting into the dried bromine after it has passed the drying system and prior to its removal to the reboiler 19.

Since steam is introduced into the bromine at a relatively high temperature and into a flowing stream of vaporized bromine, it is clear that the steam and bromine are intimately intermingled in the vapor phase throughout the length of pipe 9 until they reach the condenser 10. Also, the bromine and steam are condensed together in the condenser 10 so that the bromine and water or steam are mixed and are also further agitated, causing the bromine to be additionally intermixed with steam first and then with water as the two materials reach the liquid phase and finally flow into the gravity separator 11. By this means, a much lower volume of water can be used as compared with the ordinary water washing of the bromine. Furthermore, the water-soluble impurities, HCl and the others, are not only removed more effectively but more of the impurities are removed. Theoretically they could be removed by a water wash; but due to difficulty in contacting the large volume of bromine in the presence of such relatively small amounts of the impurities, such a water wash does not wash them out effectively as a practical matter.

It should be particularly noted that this steam treatment of the bromine in the vapor phase followed by condensation of the bromine and water vapor together is essentially an unusual type of washing operation. It should be distinguished from the use of steam in the tower in which the brine containing the bromine is treated with chlorine and steam. The steam treatment is basically a steam stripping or steam distillation step in which the bromine is entrained or removed from the many other things in the brine, such for example as magnesium, calcium and so forth. In fact steam distillation of crude bromine in an effort to purify it has been notably unsuccessful. It removes some of the less volatile impurities; but leaves virtually all of the volatile difficulty removable ones.

In most instances it is preferable to utilize a hot tube step and one way of so doing has been discussed above. However, it may be desired to practice the present invention without such a step. One way of so doing is also illustrated in the schematic drawing. In this event, the crude bromine may be introduced into the reboiler 19 by means of the pipe 20. The reboiler is maintained at a suitable temperature such that bromine is vaporized into the condenser 22 and proceeds upwardly throughout the length of the condenser 22, the less volatile impurities gradually flowing down the condenser into the reboiler and finally out of the pipe 21. The vaporized bromine in this case is introduced into the pipe 30 which may be connected to the pipe 9 and condenser 10 as shown in the drawing. A suitable steam inlet 31 is provided in the pipe 30 so that steam may be introduced into the vaporized and heated bromine for effecting washing thereof in the manner previously described. The bromine and steam are condensed into the liquid phase in the condenser 10, are separated in the separator 11, dried by the acid drying apparatus shown at 16, and the dry purified bromine removed to storage by the pipe 18.

It will be understood that appropriate apparatus is utilized where necessary or desirable in order to carry out the process of this invention and to implement it where needed. Appropriate heating and cooling means may be provided for the various units, not only those referred to in connection with the schematic drawing but others if desired. Flow control means including appropriate valves, of course, may be used, especially in the practice of the invention by a continuous operation. In this event as a practical manner the rate of input and output should be automatically controlled as by thermostatically operated valves to maintain the flow through the various units as desired and to provide sufficient time for the different units of the system to operate satisfactorily. For example, the temperatures of the vaporizer, reactor and distillation columns may be raised or lowered by such means to the desired temperature either automatically or through a suitable manually operated control system.

The invention is further illustrated by Examples I and II below.

EXAMPLE I

The laboratory apparatus of this Example was operated for a period of about 1 week. The apparatus was so arranged that a continuous process was carried out and the size of the equipment permitted operation at the rate of about 2 to 3 lbs. of bromine per hour. A 500 ml. three-necked round bottom flask was fitted with a heating mantle and was maintained approximately half full of crude bromine to be purified. A round bottom flask served as the vaporizer, and was connected with a quartz tube approximately 1 inch in diameter by 20 inches in length. This quartz tube was provided with a quartz thermowell approximately three-eighths of an inch in diameter. The effective heating volume of the tube was about 100 ccs. One inch glass tubing was used to connect the quartz tube with the steam inlet. Steam was provided by boiling water from a 500 ml. round bottomed flask and, of course, was suitably connected to a steam inlet. A condenser approximately 8 inches long was used, and the water separator was approximately 1 inch in diameter by 4 inches long. A 500 ml. round bottomed flask served as the final distillation unit and a column approximately 1 inch in diameter by 16 inches long fitted with a 5 inch condenser served to recover the treated bromine. For purposes of this laboratory procedure, a drying unit was not considered necessary but, a suitable drying unit in the form of a U-tube containing sulfuric acid could be utilized if desired.

EXAMPLE II

In this Example pilot plant equipment was used, the size of the equipment so determined as to produce about 100 lbs. of highly purified bromine per hour. This equipment was operated for some time producing satisfactory highly purified bromine on a continuous basis. In this run, the initial bromine vaporizer consisted of a stainless steel tube 3 inches in diameter by 5 feet in length. It was heated by means of a water jacket approximately 4 feet 6 inches in length. This so-called tube-type vaporizer had a capacity of approximately 5 to 10 gallons, and was capable of accepting about 3 gallons of liquid bromine per hour. This bromine vaporizer was connected with a hot tube by means of a Pyrex tube 3 inches in diameter by 4 feet in length. The hot tube was a quartz ("Vycor") tube 3 inches in diameter by 3 feet 6 inches in length. This tube was heated by six heating rods equally spaced around the outer wall of the tube. 1,000 watt "Calrod" heating rods were used and, of course, were suitably wired to an outside source of electrical energy. It was found that this hot tube could handle the 3 gallons of liquid bromine introduced into the vaporizer. The hot tube was connected to the condenser by means of a Pyrex tube 3 inches in diameter and approximately 4 feet in length having a suitable steam inlet inserted in it. The condenser was a tantalum condenser approximately 36 inches in length and was tapered from a 3 inch diameter to approximately a 2 inch diameter. The water separator had a capacity of about 1 gallon, and the acid scrubber or drier a capacity of about 2 gallons. The reboiler had a capacity of approximately 25 gallons, although a larger one could be used if desired, and was fitted with a 4 inch by 10 foot Pyrex tube operating as a distilling column. This column was connected to another tantalum condenser by means of a 4 inch by 4 foot Pyrex tube. This second tantalum condenser was 36 inches in length and approximately 2 inches in diameter. This apparatus provided a temperature in the hot tube of approximately 1,000°F., and a contact time between the vaporized bromine and the organic materials in the hot tube of somewhat in excess of 0.1 seconds.

The purified bromine produced by the particular laboratory procedure of Example I produced bromine having an overall purity of 99.95 percent or better (500 parts per million of overall impurities). Chlorine was less than 30 parts per million, organic material less than 30 parts per million, water less than 30 parts per million, and HCl less than 2 parts per million. Bromine of this purity while satisfactory as highly purified bromine for many purposes, leaves something to be desired. Careful operation of the pilot plant process referred to in Example II produced bromine having purity of 99.98 percent or better (less than 200 parts per million total impurities). This bromine also contained total organic material less than 30 parts per million, and water less than 30 parts per million. It contained less than 2 parts per million of HCl and less than 30 parts per million of chlorine. Nonvolatile residue was less than 60 parts per million. Bromine meeting these specifications is considered to be very highly purified bromine, and as noted above, was produced in pilot plant quantities for an extensive run.

In some instances, especially those in which the chlorine content of the crude bromine is rather high, it may be desirable to add some hydrocarbon material to the system to assist in removing the chlorine. Such added hydrocarbon material is introduced in sufficient amounts to react with the bromine to generate hydrogen bromide which in turn reacts with the chlorine present to produce bromine and hydrogen chloride. For example, carbon pellets may be introduced into the hot tube or introduced into the system immediately after the hot tube step. Thus, the bromine is recovered, although the quantity so recovered is quite small. The important feature of this step is the fact that hydrogen chloride was produced instead of hydrogen bromide, for the most part, and hydrogen chloride is easier to remove from the bromine than hydrogen bromide.

It will be noted that the addition of carbon pellets or other hydrocarbon material is recommended only if the chlorine content of the crude bromine is relatively high. It is believed that normally there will be enough hydrocarbon material in the bromine to get the result mentioned without the addition of further hydrocarbon material. In a few instances, it may be desirable to add some chlorine to the system so that the hydrocarbon impurities may be more readily removed, and so that enough chlorine will be present to react with all, or substantially all, of the HBr. If the crude bromine contained relatively high quantities of hydrocarbon materials and relatively little chlorine, it will be seen that this balancing of chlorine and hydrocarbon materials will permit the formation of HCl instead of HBr and, as noted above, this is of assistance in purifying the bromine as well as recovering some bromine. The preparation of high-purity bromine utilizing such addition of hydrocarbon materials, or chlorine, as the case may be, to the bromine as an aid in producing purer bromine is disclosed in greater detail in U.S. Pat. No. 3,314,762.

What is claimed is:

1. A process for producing purified bromine from relatively impure liquid bromine comprising the steps of:
   a. vaporizing said relatively impure liquid bromine to form bromine vapor containing water-soluble impurities,
   b. passing said bromine vapor and at least some of said impurities through a condensing means,
   c. heating the bromine vapor and impurities which have passed through said condensing means to at least 700° F.,
   d. thereafter introducing steam into said heated bromine vapor and impurities thereby forming an intimate mixture of bromine vapor and steam,
   e. condensing said intimate mixture of bromine vapor and steam to form water and liquid bromine,
   f. separating the liquid bromine from the water, and
   g. drying the liquid bromine, thereby providing purified bromine.

2. A process for producing liquid bromine according to claim 1 wherein step (c) is modified by passing the relatively impure bromine vapor through a heated zone having a temperature in the range of from 700° to 1,000° F.

3. A process according to claim 2 wherein said heated zone is a tube containing packing material.

* * * * *

UNITED STATES PATENT OFFICE
CERTIFICATE OF CORRECTION

Patent No. 3,642,447                         Dated February 15, 1972

Inventor(s) Hahn et al

It is certified that error appears in the above-identified patent and that said Letters Patent are hereby corrected as shown below:

At the top of Column 1, following the inventors' names and addresses, insert

-- , assignors to Michigan Chemical Corp., a corporation of the State of Michigan. --

Signed and sealed this 9th day of May 1972.

(SEAL)
Attest:

EDWARD M. FLETCHER, JR.                ROBERT GOTTSCHALK
Attesting Officer                      Commissioner of Patents